US011275747B2

United States Patent
Hsiao et al.

(10) Patent No.: US 11,275,747 B2
(45) Date of Patent: Mar. 15, 2022

(54) SYSTEM AND METHOD FOR IMPROVED SERVER PERFORMANCE FOR A DEEP FEATURE BASED COARSE-TO-FINE FAST SEARCH

(71) Applicant: VERIZON MEDIA INC., New York, NY (US)

(72) Inventors: Jenhao Hsiao, Taipei (TW); Jia Li, Santa Clara, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 748 days.

(21) Appl. No.: 14/656,390

(22) Filed: Mar. 12, 2015

(65) Prior Publication Data

US 2016/0267637 A1    Sep. 15, 2016

(51) Int. Cl.
*G06F 16/2457* (2019.01)
*G06Q 30/02* (2012.01)
(Continued)

(52) U.S. Cl.
CPC ........ *G06F 16/24578* (2019.01); *G06F 16/56* (2019.01); *G06F 16/5854* (2019.01);
(Continued)

(58) Field of Classification Search
CPC .................. G06Q 30/0251; G06Q 30/0623
See application file for complete search history.

(56) References Cited

U.S. PATENT DOCUMENTS

| 8,644,620 | B1 * | 2/2014 | Lam ..................... H04N 19/23 |
| | | | 382/209 |
| 2002/0186882 | A1 * | 12/2002 | Cotman ............. G06K 9/00127 |
| | | | 382/165 |

(Continued)

OTHER PUBLICATIONS

Li, Jing. 'Brief Introduction of Back Propagation (BP) Neural Network Algorithm and Its Improvement'. Springer Link [online], published 2012 [retrieved on Jan. 27, 2021]. Retrieved from the Internet: < URL: https://link.springer.com/chapter/10.1007/978-3-642-30223-7_87 >. (Year: 2012).*

(Continued)

*Primary Examiner* — Christopher B Tokarczyk
(74) *Attorney, Agent, or Firm* — James J. DeCarlo; Greenberg Traurig, LLP

(57) ABSTRACT

Disclosed are systems and methods for improving interactions with and between computers in a search system supported by or configured with search servers or platforms. The systems interact to identify and retrieve data across platforms, which data can be used to improve the quality of results data used in processing interactions between or among processors in such systems. The disclosed systems and methods provide a Deep Fast Search (DFS) that improves content search accuracy that executes independent of the search database, while achieving an increased content retrieval speed. The disclosed systems and methods employ two complementary deep feature searches: 1) a coarse deep feature search and a 2) fine deep feature search. Thus, the disclosed systems and methods employ a coarse-to-fine (Continued)

strategy that embodies the efficiency and cost effectiveness of the coarse deep feature search and the accuracy of the fine deep feature search.

10 Claims, 10 Drawing Sheets

(51) Int. Cl.
| | | |
|---|---|---|
| *G06F 16/56* | (2019.01) | |
| *G06F 16/951* | (2019.01) | |
| *G06F 16/583* | (2019.01) | |
| *G06K 9/46* | (2006.01) | |
| *G06K 9/00* | (2006.01) | |
| *G06K 9/62* | (2006.01) | |

(52) U.S. Cl.
CPC ....... *G06F 16/951* (2019.01); *G06K 9/00624* (2013.01); *G06K 9/4628* (2013.01); *G06K 9/6271* (2013.01); *G06Q 30/0256* (2013.01)

(56) References Cited

U.S. PATENT DOCUMENTS

| | | | | |
|---|---|---|---|---|
| 2004/0025025 A1* | 2/2004 | Venkatesan | ....... | G06F 17/30247 713/176 |
| 2006/0095521 A1* | 5/2006 | Patinkin | ............... | G06Q 10/107 709/206 |
| 2007/0239756 A1* | 10/2007 | Li | .......................... | G06F 16/951 |
| 2008/0212899 A1* | 9/2008 | Gokturk | ............ | G06F 17/30259 382/305 |
| 2009/0220166 A1* | 9/2009 | Choi | .......................... | G06K 9/38 382/260 |
| 2009/0297050 A1* | 12/2009 | Li | ....................... | G06K 9/00684 382/225 |
| 2010/0161654 A1* | 6/2010 | Levy | ................. | G06F 17/30032 707/769 |
| 2014/0245122 A1* | 8/2014 | Oro | .................... | G06F 17/2785 715/230 |
| 2014/0270488 A1* | 9/2014 | Suleyman | .......... | G06K 9/00362 382/157 |
| 2014/0376819 A1* | 12/2014 | Liu | ....................... | G06K 9/3233 382/205 |
| 2015/0006444 A1* | 1/2015 | Tamatsu | .................. | G06N 3/082 706/12 |
| 2015/0106306 A1* | 4/2015 | Birdwell | .................. | G06N 3/10 706/11 |
| 2015/0178786 A1* | 6/2015 | Claessens | .......... | G06Q 30/0269 705/14.66 |
| 2015/0227805 A1* | 8/2015 | Stokman | ............... | H04N 5/2621 382/286 |
| 2015/0254532 A1* | 9/2015 | Talathi | ....................... | G06K 9/66 382/156 |
| 2016/0012304 A1* | 1/2016 | Mayle | ....................... | G06K 9/46 382/209 |
| 2016/0019459 A1* | 1/2016 | Audhkhasi | ............... | G06N 3/08 706/22 |
| 2016/0034814 A1* | 2/2016 | Audhkhasi | ............... | G06N 3/08 706/12 |
| 2016/0035078 A1* | 2/2016 | Lin | ........................... | G06K 9/66 382/157 |
| 2016/0042253 A1* | 2/2016 | Sawhney | .............. | G06K 9/6255 382/190 |
| 2016/0063359 A1* | 3/2016 | Szegedy | ................. | G06N 3/063 382/158 |
| 2016/0117587 A1* | 4/2016 | Yan | ....................... | G06N 3/0454 706/20 |
| 2016/0140438 A1* | 5/2016 | Yang | ......................... | G06N 3/08 706/12 |
| 2016/0174902 A1* | 6/2016 | Georgescu | ............ | G06T 7/0012 600/408 |
| 2016/0180151 A1* | 6/2016 | Philbin | ............... | G06K 9/00288 382/118 |
| 2016/0180200 A1* | 6/2016 | Vijayanarasimhan | ....................... | G06N 3/082 382/157 |
| 2016/0189009 A1* | 6/2016 | Tran | ...................... | G06N 3/0454 382/158 |
| 2016/0225053 A1* | 8/2016 | Romley | .............. | G06Q 30/0623 |
| 2018/0033055 A1* | 2/2018 | Stewart | .............. | G06Q 30/0277 |
| 2018/0204111 A1* | 7/2018 | Zadeh | .................. | G06K 9/3233 |

OTHER PUBLICATIONS

Cilimkovic, Mirza. 'Neural Networks and Back Propagation Algorithm'. Google Patents [online], published 2015 [retrieved on Jan. 27, 2021]. Retrieved from the Internet: <URL: http://dataminingmasters.com/uploads/studentProjects/NeuralNetworks.pdf >. (Year: 2015).*
Ou et al., "Convolutional neural codes for image retrieval," Signal and Information Processing Association Annual Summit and Conference (APSIPA), 2014 Asia-Pacific, 2014, pp. 1-10. (Year: 2014).*

* cited by examiner

FIG. 4     400
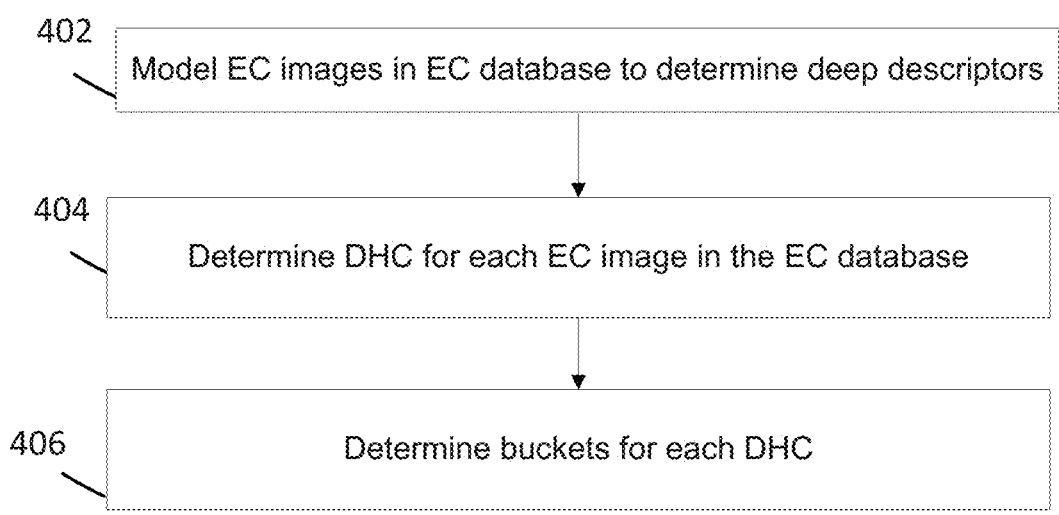

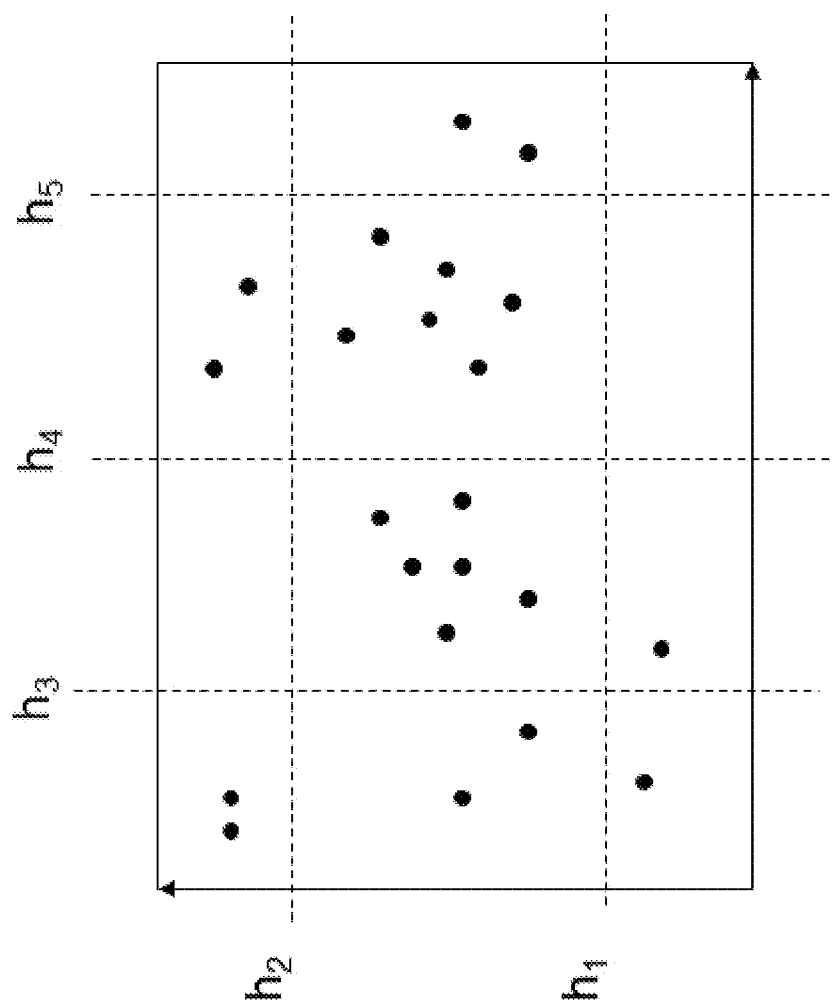

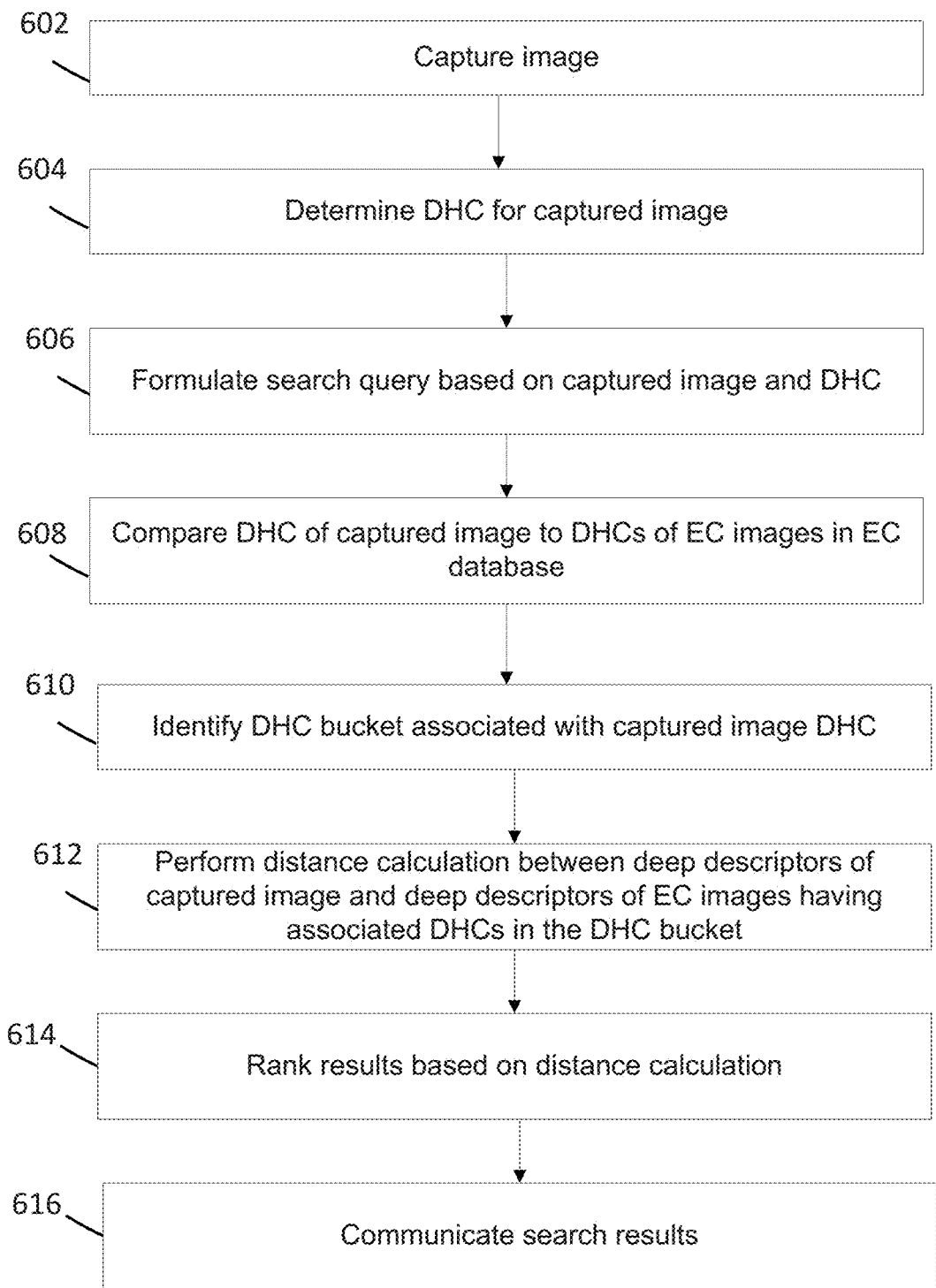

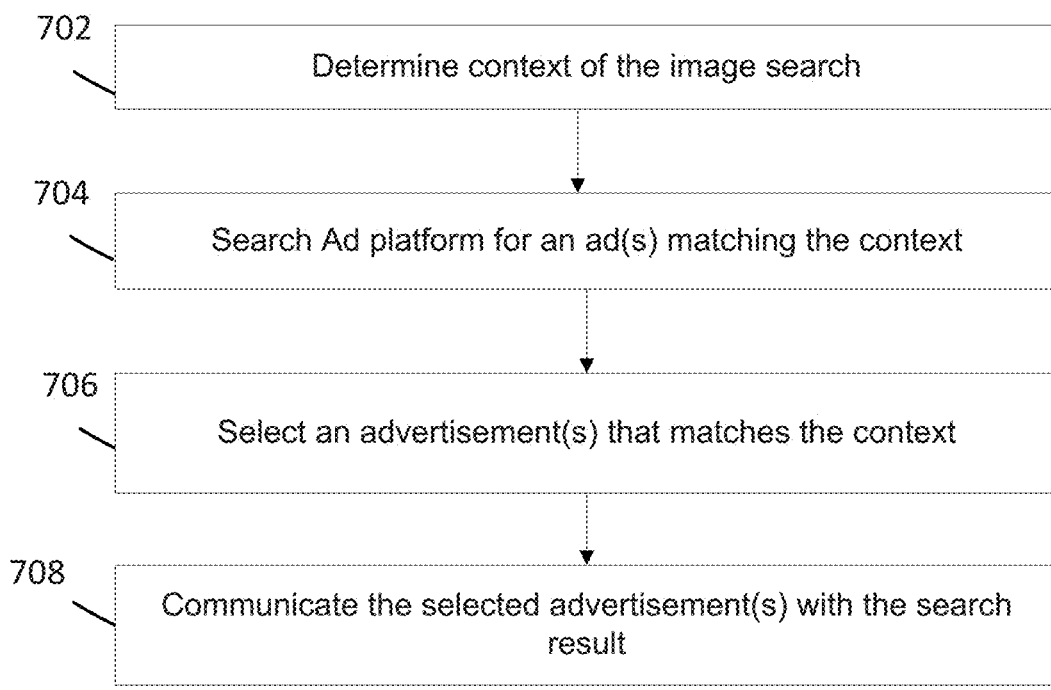

SYSTEM AND METHOD FOR IMPROVED SERVER PERFORMANCE FOR A DEEP FEATURE BASED COARSE-TO-FINE FAST SEARCH

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of search server systems and/or platforms by modifying the capabilities of such systems and/or platforms to perform a deep feature based coarse-to-fine fast search for content retrieval over a network.

SUMMARY

In general, the present disclosure describes improved computer system and methods directed to determining image similarity for electronic commerce (EC) products. That is, the present disclosure provides systems and methods for searching for and identifying images based on features and descriptors of an image query. According to some embodiments, the disclosed systems and methods enable the identification of content objects (for example, images) from an expedited search based not only the features of the content and search query, but also based on structured areas within and associated with such content and query.

According to some embodiments of the present disclosure, the disclosed computer systems and methods provide a Deep Fast Search (DFS) that improves content search accuracy while achieving an increased content retrieval speed. According to some embodiments, the disclosed systems and methods utilize deep learning techniques trained on large data sets of content to enhance content feature discriminability. Such content, as discussed herein for example, can be images of and/or associated with EC products.

According to embodiments of the present disclosure, the disclosed systems and methods employ two complementary and serially performed deep feature searches: 1) a coarse deep feature search and a 2) fine deep feature search. As discussed herein, the course deep feature search is a more efficient search comparable to the fine deep feature search; however, the fine deep feature search provides significant improvements to accuracy. Therefore, the disclosed systems and methods employ a coarse-to-fine strategy that embodies the efficiency and cost effectiveness of the coarse deep feature search and the accuracy of the fine deep feature search.

Utilizing such a complementary search methodology, the disclosed systems and methods can function independent of the size of the content database being searched due to the sophisticated deep hash code (DHC) utilized within the disclosed "coarse-to-fine" search. For example, millions of images can be searching in as few as 5 milliseconds as opposed to conventional systems taking upwards of full seconds to perform such search.

Moreover, the disclosed systems and methods can provide for compact EC product representation without loss in matching accuracy due to reduced data being communicated during a search (as opposed to sending floating points or feature vectors as search queries, as with conventional systems). This enables applications of the disclosed systems and methods within mobile environments as well as the standard desktop/laptop environment. Indeed, the disclosed "coarse-to-fine" search can be embodied as a system, platform, or configured as a part of a search engine, in addition to being provided and implemented as a stand-alone application, which can also be integrated within any type of web-based or mobile system, platform or device. The disclosed DFS systems and methods deliver increased search accuracy because much of the discriminative power typically wasted in a search is preserved by utilizing both the 1) coarse and 2) fine deep features. These features also provide increased efficiency in both memory and matching speeds as compared to existing similarity methods.

In accordance with one or more embodiments, a method is disclosed which includes receiving, at a computing device over a network from a user, a search query comprising image data associated with a captured image; extracting, via the computing device, features of the captured image from the image data, the features comprising deep descriptors of the captured image and information associated with a content category of the captured image; determining, via the computing device, a deep hash code (DHC) for the captured image based on the extracted features, the DHC comprising n-dimensional values proportional to a number of extracted features; comparing, via the computing device, the DHC of the captured image with DHCs of images in an e-commerce (EC) database, the comparison comprising identifying EC images that correspond to a similar content category of the captured image; computing, via the computing device, a similarity between the DHC of the captured image and DHCs of the EC images identified to be in the similar content category; and communicating, via the computing device over the network, a search result to the user based on the computation, the search result comprising EC images having a similarity satisfying a threshold.

In accordance with one or more embodiments, a method is disclosed which includes capturing, via a computing device, an image of an item, the captured image comprising image data generated from the capturing; extracting, via the computing device, features of the captured image from the image data, the features comprising deep descriptors of the captured image and information associated with a content category of the captured image; determining, via the computing device, a deep hash code (DHC) for the captured image based on the extracted features, the DHC comprising n-dimensional values proportional to a number of extracted features; communicating, via the computing device over a network, a search query to search for images in an e-commerce (EC) database, the search query comprising the features and the DHC; receiving, via the computing device over the network, a search result comprising image data of at least one EC image from the EC database, the at least one EC image having an associated DHC within a similar content category of the captured image and a DHC similarity above a threshold; and displaying, via the computing device, the search result, the display comprising displaying the at least one EC image in accordance with the DHC similarity.

In accordance with one or more embodiments, a method is disclosed which includes analyzing, via a computing device, each image in an e-commerce (EC) database, the analysis comprising identifying features of each image and extracting deep descriptors from each EC image based on the identified features; determining, via the computing device, a deep hash code (DHC) for each image based on the extracted features, the DHC comprising n-dimensional values proportional to a number of extracted features; determining, via the computing device, a semantic similarity between each image based on the determined DHC for each image, the determination comprising determining a label for each image based on each image's deep descriptors, the label comprising information indicating a particular content category of an image; receiving, via the computing device, a search request comprising image data for images in the EC database; and searching, via the computing device, the EC database for images by analyzing the received image data in accordance with the determined semantic similarity and determined label for each image, the searching comprising identifying and communicating a search result based on the analysis.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for a deep feature based coarse-to-fine fast search for content retrieval over a network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a flowchart illustrating steps performed in accordance with some embodiments of the present disclosure;

FIGS. 5A-5C illustrate non-limiting example diagram embodiments in accordance with some embodiments of the present disclosure;

FIG. 6 is a flowchart illustrating steps performed in accordance with some embodiments of the present disclosure;

FIG. 7 is a flowchart illustrating steps performed in accordance with some embodiments of the present disclosure.

DESCRIPTION OF EMBODIMENTS

Figure 1:
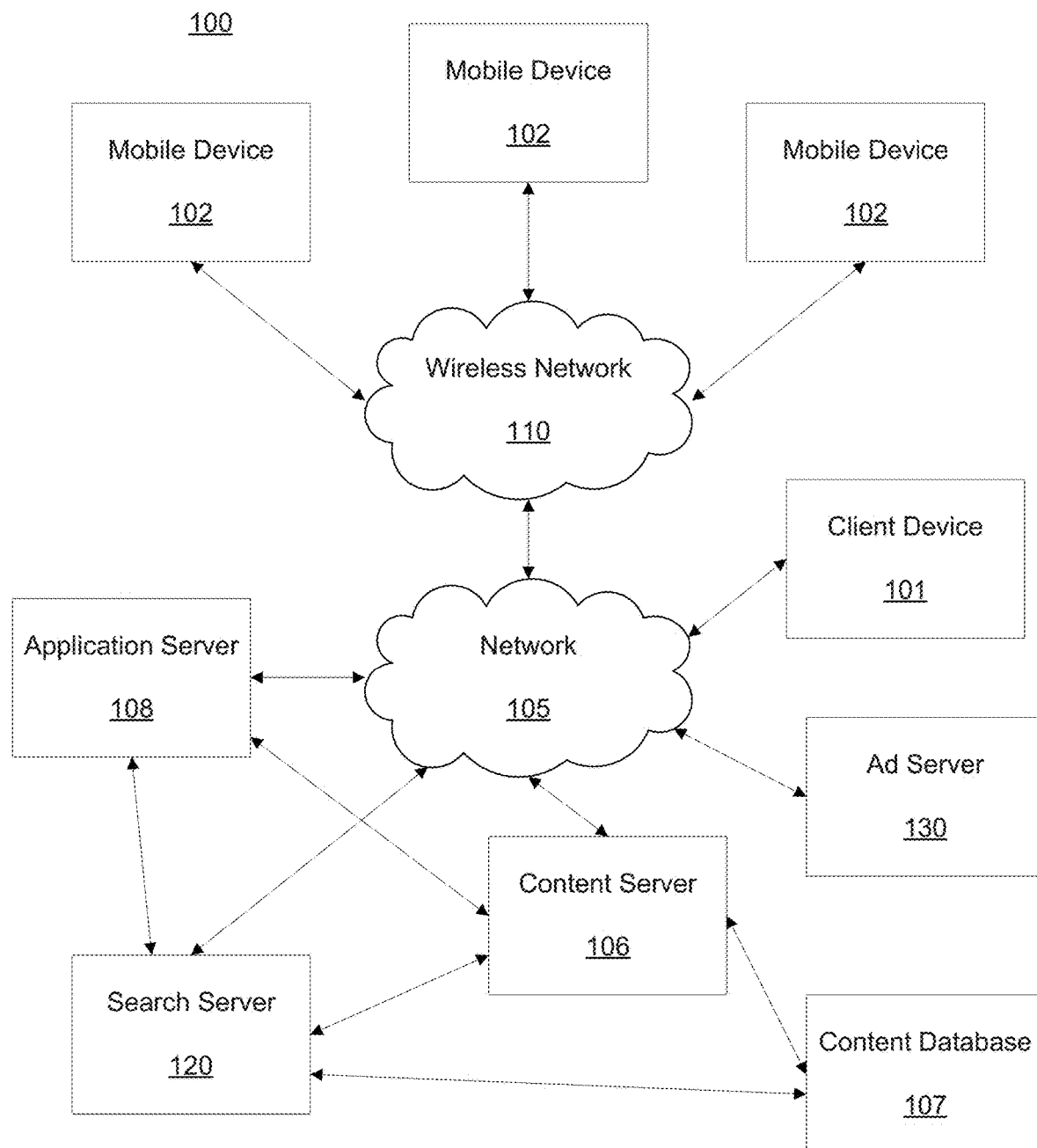
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer to alter its function, a special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, the size of digital image archives in recent years has been growing exponentially. The wealth of images on the Internet is ever-increasing due to archives of content from news publishing agencies, internet communities and private users, and the like. Along with the size of the archives, the difficulty of finding archived images is also increasing difficult and costly.

Conventional systems have been developed for describing images based on their visual descriptors within the image, and for executing search processes based on these visual descriptors. For example, a conventional system may employ a content-based similarity search with regard to a visual descriptor, for example: a user provides an exemplary image as a search query. A search engine reads the corresponding descriptor with regard to this example image from a database and calculates the distance measures to all images in the database via the similarity measure of the descriptor. Images with a low distance (images with a sufficiently low distance which is, for example, smaller than a predetermined threshold value) are output as a result of the search.

However, such search and similarity techniques can only achieve limited accuracy due to weaknesses in the implemented schemes. For example, conventional systems are mainly based on low-level or hand-crafted features, which can only provide very limited low-level description about products and often fail to comprehensively describe the appearance of a product. In addition to accuracy, the existing systems' retrieval speed is also largely constrained by the scale of data. That is, as with most existing similarity methods, the image search is based upon pure linear search, which is problematic when such searches are applied to a large-scale environment.

The disclosed systems and methods remedy shortcomings in the art, and provide improved computer systems and methods instituting increased functionality to the computer executing the disclosed systems and methods by providing a Deep Fast Search (DFS) that improves content search accuracy while achieving an increased content retrieval speed. Such content, as discussed herein, can be images of and/or associated with EC products. While the discussion herein focuses upon searches for and based on images (e.g., image data and metadata), it should be understood that the present disclosure is not so limiting. That is, the disclosed systems and methods can be applied to any known or to be known type of content object/item, including, but not limited to, text, video, audio, or other types of multi-media, including any known or to be known type of message or data stored in a datastore or utilized in or as a search query.

As discussed in more detail below, in some embodiments, the disclosed systems and methods utilize "deep learning" techniques trained on large data sets of images. In accordance with embodiments of the present disclosure, "deep learning" (also referred to as deep structured learning or hierarchical learning) involves machine learning algorithms that model high-level abstractions in data by using model architectures composed of multiple non-linear transformations. Deep learning is part of a broader family of machine learning methods based on learning representations of data. An observation (e.g., an image) can be represented in many ways such as a vector of intensity values per pixel, or in a more conceptual way as a set of edges, regions of particular shape, and the like. The implementation of deep learning as part of the disclosed systems and methods enables the replacement of handcrafted features with efficient algorithms for unsupervised or semi-supervised feature learning and hierarchical feature extraction from EC product images.

As discussed in more detail below, the disclosed systems and methods can implement any known or to be known deep learning architecture or algorithm, such as, but not limited to, deep neural networks, artificial neural networks (ANNs), convolutional neural networks (CNNs), and deep belief networks can be utilized herein. According to some embodiments, as discussed in more detail below, the disclosed deep learning methodology employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, ReLU (rectified linear unit) layer, pooling layer, dropout layer and loss layer, as understood by those of skill in the art. When used for image recognition and similarity, CNNs produce multiple tiers of deep feature collections by analyzing small portions of an input image.

For purposes of this disclosure, such features/descriptors can include, but are not limited to, visual characteristics of the images characterized (or categorized and labeled) by color features, texture features, type features, edge features and/or shape features, and the like. The results of these collections are then tiled so that they overlap to obtain a better representation of the original image; which is repeated for every CNN layer. CNNs may include local or global pooling layers, which combine the outputs of feature clusters. One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

Indeed, it should be understood by those of skill in the art that the features (or descriptors or deep descriptors) of content items being searched for and those being used as the search query can include any type of information contained in, or associated therewith, image data, video data, audio data, multimedia data, metadata, or any other known or to be known content that can be associated with, derived from or comprised within the content item (or media file). In some embodiments, such feature data can be audio data associated with an image (or media file) that plays when the image is viewed, for example. In another example, feature data can include comments or user feedback (e.g., comments on a social network) that are associated with not only the image file, but also data associated with the source of the file.

The disclosed systems and methods employ two complementary deep feature searches: 1) a coarse deep feature search and a 2) fine deep feature search, each of which implements a known or to be known deep feature methodology (e.g., CNN), as discussed above. As discussed in more detail below, the disclosed systems and methods employ a coarse-to-fine strategy that embodies the efficiency and cost effectiveness of the coarse deep feature search and the accuracy of the fine deep feature search.

According to embodiments of the present disclosure, applying such a complementary search methodology to a deep-learning trained dataset of EC products enables the functioning of the disclosed systems and methods to operate independent of the size of the content database being searched. The independence of the search is resultant of a deep hash code (DHC) embodied within the disclosed "coarse-to-fine" search. As discussed in more detail below, the DHC implemented herein (using bit-wise operations, in some embodiments) enables the comparison of deep features extracted and identified from, for example, the CNN. This enables highly efficient similarity comparisons to be performed when searching the EC product dataset which results in increasingly accurate image retrieval of associated images of the identified EC products, as discussed in more detail below.

According to some embodiments, information associated with a search query, EC product search result, the EC product dataset, or some combination thereof, can be used for monetization purposes and targeted advertising when providing such search results, which can lead to an increased click-through rate (CTR) of such ads and/or an increase in the advertiser's return on investment (ROI) for serving such content provided by third parties (e.g., advertisement content provided by an advertiser, where the advertiser can be a third party advertiser, or an entity directly associated with or hosting the search systems and methods discussed herein)

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102 and client device 101. FIG. 1 additionally includes a variety of servers, such as content server 106, application (or "App") server 108, search server 120 and advertising ("ad") server 130.

One embodiment of mobile devices 102-103 is described in more detail below. Generally, however, mobile devices 102 may include virtually any portable computing device capable of receiving and sending a message over a network, such as network 105, wireless network 110, or the like. Mobile devices 102 may also be described generally as client devices that are configured to be portable. Thus, mobile devices 102 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, phablets, integrated devices combining one or more of the preceding devices, and the like. As such, mobile devices 102 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102 may uniquely identify themselves through any of a variety of mechanisms, including a phone number, Mobile Identification Number (MIN), an electronic serial number (ESN), or other mobile device identifier.

In some embodiments, mobile devices 102 may also communicate with non-mobile client devices, such as client device 101, or the like. In one embodiment, such communications may include sending and/or receiving messages, searching for and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-102 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102 and its components with network 105. Wireless network 110 may include any of a variety of wireless sub-networks that may further overlay stand-alone ad-hoc networks, and the like, to provide an infrastructure-oriented connection for mobile devices 102. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including, but not limited to, 2nd (2G), 3rd (3G), and/or 4th (4G) generation radio access for cellular systems (and/or other advances in such technology including, for example, $5^{th}$ (5G) generation radio access), WLAN, Wireless Router (WR) mesh, and the like. Access technologies such as 2G, 3G, 4G and future access networks may enable wide area coverage for mobile devices, such as mobile devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102 and another computing device, network, and the like.

Network 105 is configured to couple content server 106, application server 108, or the like, with other computing devices, including, client device 101, and through wireless network 110 to mobile devices 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, search services, email services, photo services, web services, third-party services, audio services, video services, instant messaging (IM) services, SMS services, MMS services, FTP services, voice over IP (VOIP) services, or the like. Such services, for example a search engine and/or search platform, can be provided via the search server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, search servers, email servers, social networking services servers, SMS servers, IM servers, MMS servers, exchange servers, photo-sharing services servers, and travel services servers, via the network 105 using their various devices 101-102. In some embodiments, applications, such as a search application (e.g., Yahoo! Search®, and the like), can be hosted by the application server 108 (or search server 120). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
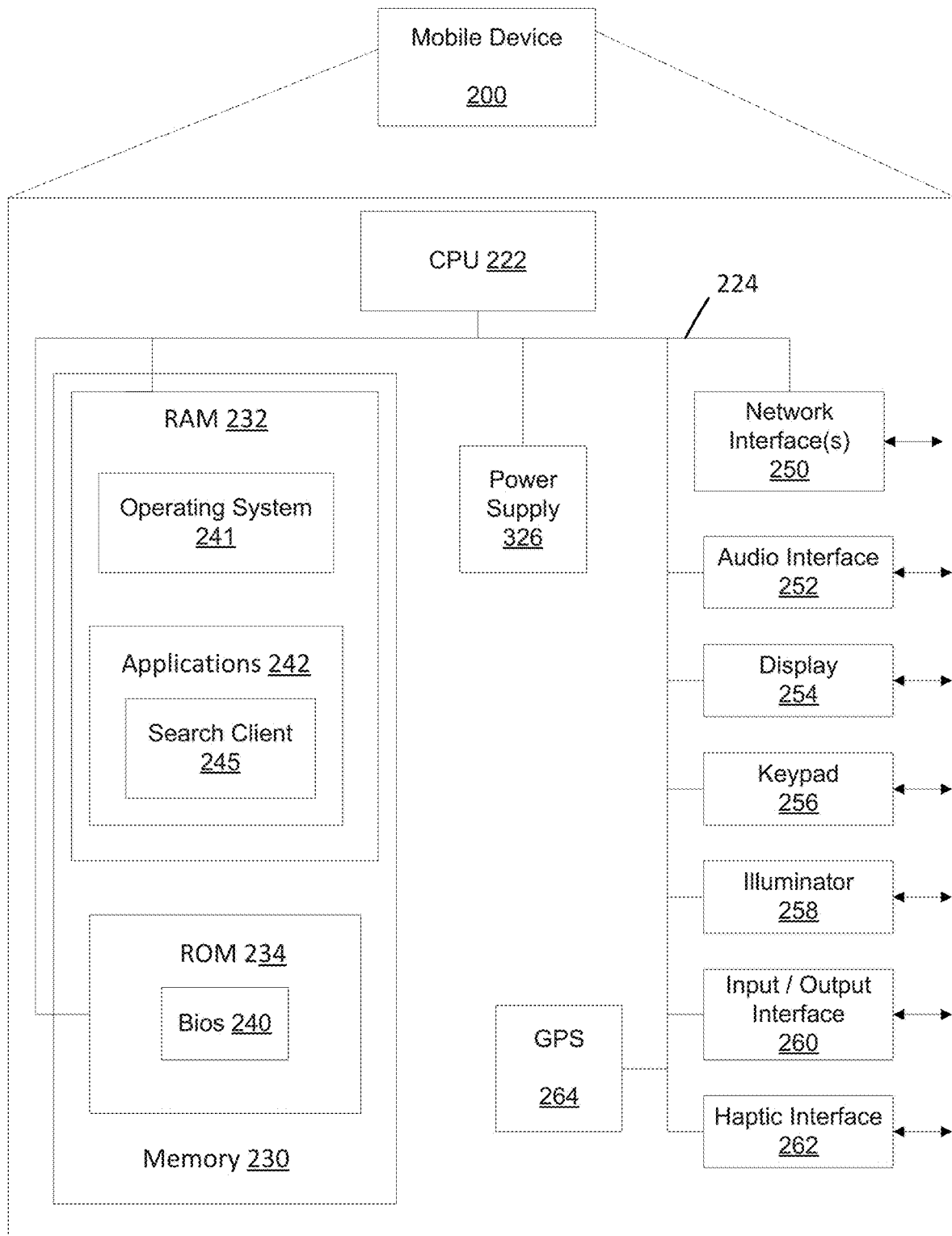
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query messages, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described.

Figure 3:
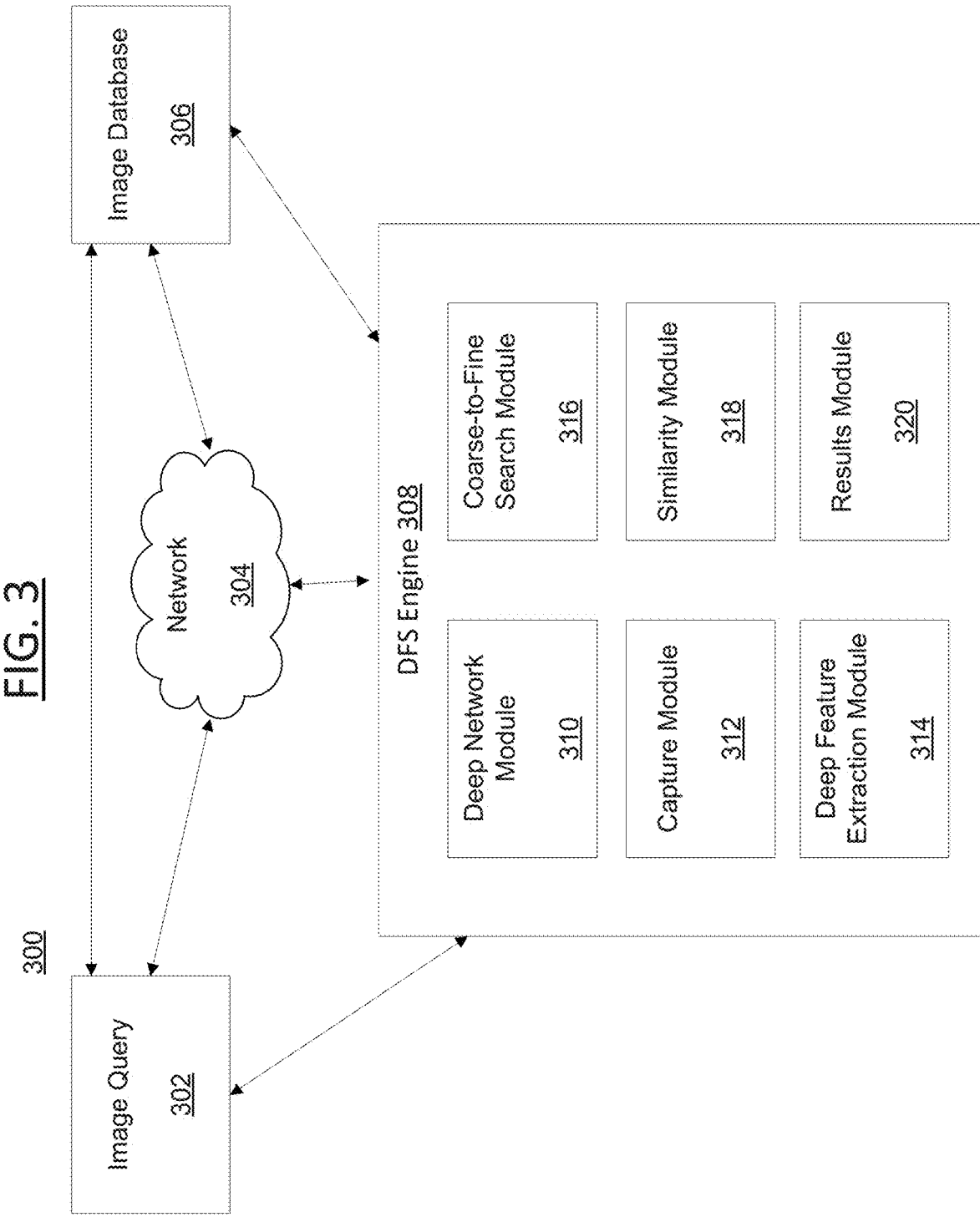
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes an image query 302, network 304, an image database 306, and a DFS engine 308. The DFS engine 308 is a special purpose machine or processor and could be hosted by a web server, search server, content provider, email service provider, ad server, user's computing device, or any combination thereof. The image database 306 can be any type of database or memory, and can be associated with an image server (e.g., content server 106 or search server 120, for example). The image database 306 comprises a dataset of images associated with EC products. For example, if an EC product is a bottle of shampoo, then the associated image may be an image depiction of the shampoo product, or a picture of a person washing their hair, embodied as, for example, but not limited to, a JPEG image. Thus, it should be understood that the image data (and metadata) in the image database 306 can be any type of image information and type, whether known or to be known, without departing from the scope of the present disclosure.

As discussed above and in more detail below, the image data/metadata provides the basis for the features/deep descriptors of the images. Such features/descriptors can be directly based on the information contained in the data/metadata of an image; and in some embodiments, as discussed below, the features/descriptors can be derived from such image data/metadata.

For purposes of the present disclosure, as discussed above, images of EC products (which are stored and located in database 306) as a whole are discussed within some embodiments; however, it should not be construed to limit the applications of the systems and methods discussed herein. Indeed, while reference is made throughout the instant disclosure to EC products being represented as images, other forms of information, including text, audio, video or multi-media information can be used to represent (or be associated with) EC products, which can thereby be communicated and/or accessed and processed by the DFS engine 308 according to the systems and methods discussed herein.

The image query 302 can comprise any type of data that typically is comprised within a search query (or message) being communicated between or within devices, or over a network. According to some embodiments, the image query 302 comprises data resultant from an image capture that is processed according to the deep feature extraction methodology discussed below in FIG. 4.

As discussed above, with reference to FIG. 1, the network 304 can be any type of network such as, but not limited to, a wireless network, a local area network (LAN), wide area network (WAN), the Internet, or a combination thereof. The network 304 facilitates connectivity of the image query 302, the DFS engine 308, and the database of stored resources 306. Indeed, as illustrated in FIG. 3, the image query, DFS engine 308 and database 306 can be directly connected by any known or to be known method of connecting and/or enabling communication between such devices and resources.

The principal processor, server, or combination of devices that comprises hardware programmed in accordance with the special purpose functions herein, referred to for convenience as DFS engine 308, includes a deep network (training) module 310, capture module 312, deep feature extraction module 314, coarse-to-fine search module 316, similarity module 318 and results module 320. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4-7.

FIG. 4 is a process 400 diagram illustrating steps performed in accordance with embodiments of the present disclosure for modeling a network for purposes of performing a DFS search that provides product search via image retrieval, as discussed above. As discussed in detail below, the trained or modeled DFS process 400 delivers improved search accuracy over conventional systems because much of discriminative power of the search server that is typically wasted by such conventional systems is preserved by the coarse and fine deep features, which are, at the same time, increasingly efficient in both memory and matching speed. Indeed, the retrieval time of similar EC product images is independent of the size of the EC database being searched.

Process 400 is performed by the DFS engine 308 and focuses upon modeling a product image database to effectuate the efficient and accurate DFS search discussed herein. Process 400 begins with Step 402 where EC product images within an EC database are modeled. Such modeling involves applying a deep leaning algorithm, as discussed above (e.g., CNN), to a dataset of EC product images on an e-commerce site and their corresponding labels (or categories) to determine the deep descriptors of the image. According to some embodiments, the labels of images can be pre-assigned by the content creator, EC product owner or distributor, the system as a whole, and the like, or some combination thereof. For example, given a set of training images (e.g., EC product images) and each image's corresponding label, a CNN model can be constructed whereby a middle layer of the CNN (e.g., hidden layer in FIG. 5B) can be utilized to determine a deep descriptor of each image. Therefore, as discussed in more detail below, the transformation of a deep descriptor into a DHC (via a hash function as in Step 404) can lead to the determination of a DHC bucket.

Figure 5A:
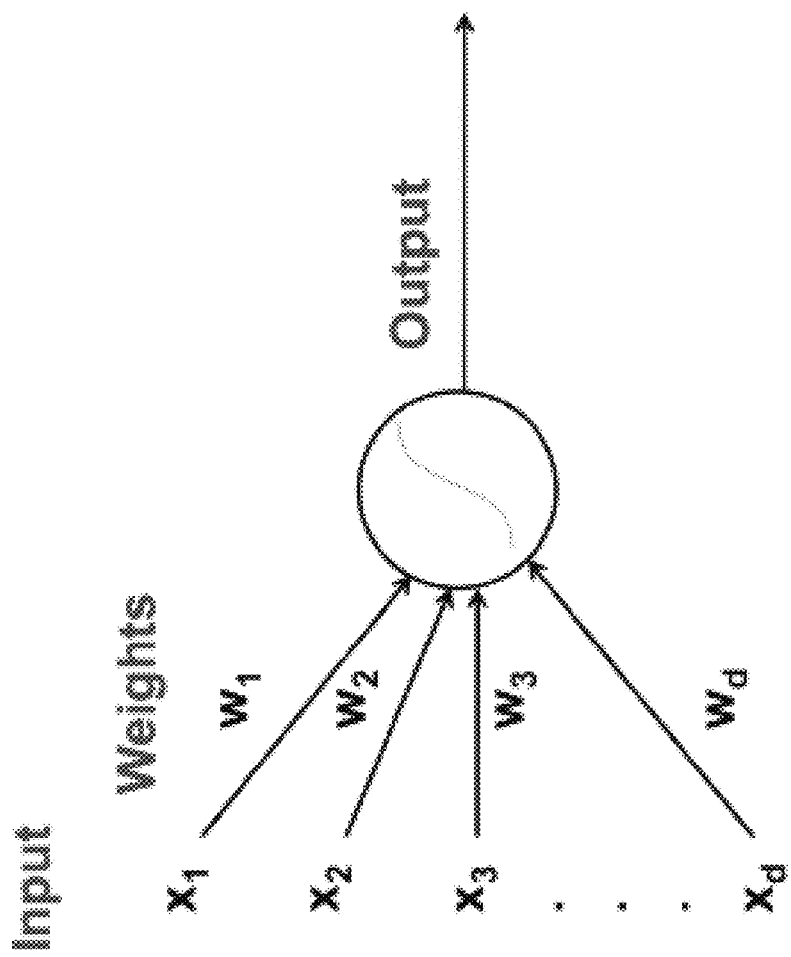
Figure 5B:
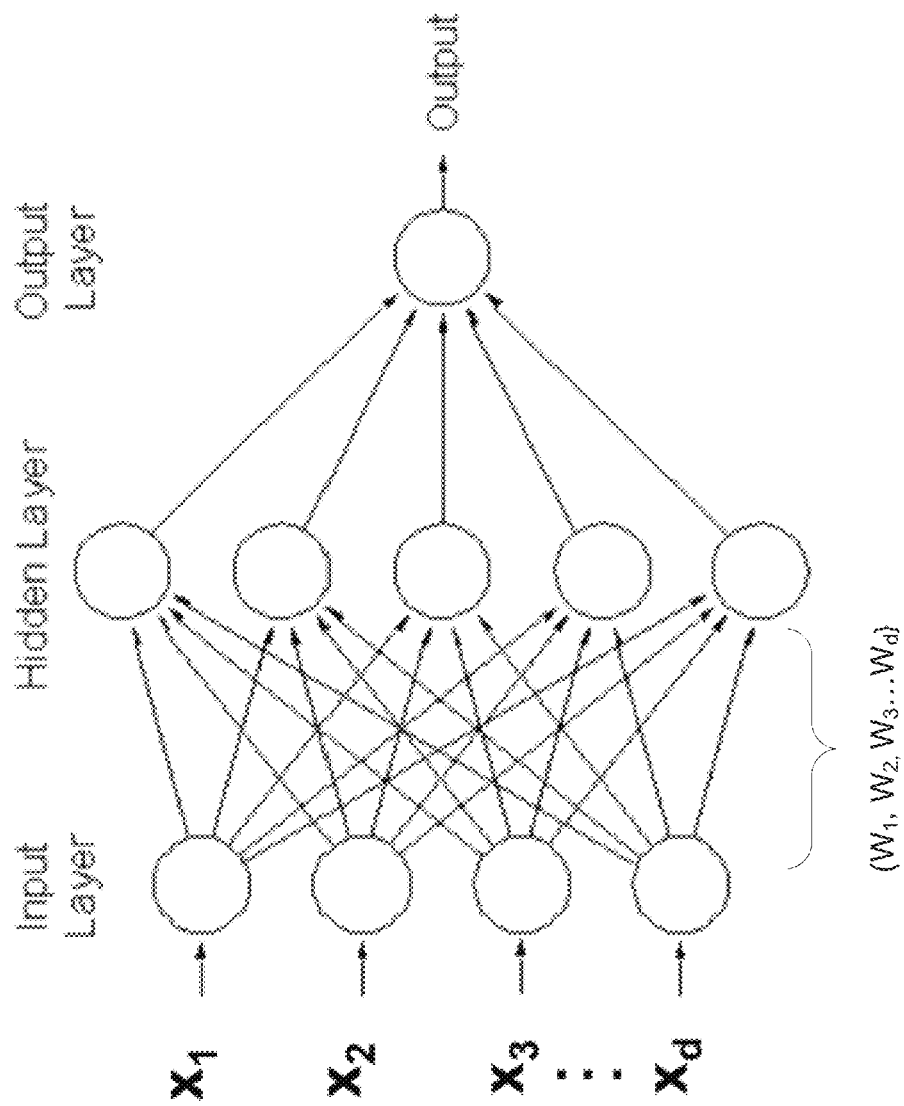

According to some embodiments, Step 402 can be generally embodied in FIG. 5A. FIG. 5A illustrates a simplified non-limiting example embodiment of neural network learning. Here, FIG. 5A illustrates how an image X in an EC database is analyzed to learn the deep features of the image, referred to as deep descriptors (e.g., modeled according to Step 402). In this example, the features are the pixels ($X_1$, $X_2$, $X_3$ ... $X_d$) of the image X (however, other embodiments exist where other known or to be known features of an image may be utilized). It should be understood that while the discussion related to FIG. 5A is for a sole image and a single layer CNN, such analysis can be performed for each image in a database (e.g., database 306) in accordance with a multiple layered CNN, as illustrated in FIG. 5B.

As illustrated in FIG. 5A, image X is the input, and the output comprises extracted deep descriptors and a predicted image label. FIG. 5A illustrates the determination of a weight set ($W_1$, $W_2$, $W_3$ ... $W_d$) that optimizes a prediction accuracy to a value at or below an output threshold (or value). Here, to learn the weight set, the CNN can implement any known or to be known classification algorithm, including, but not limited to, a perceptron learning algorithm and a back-propagation algorithm, and the like. Thus, as a result of an applied classification algorithm, for example, a perceptron learning algorithm, weight set values are determined for each pixel so that the output of the weight value ($W_1, W_2, W_3 \ldots W_d$) applied to (e.g., multiplied by) the respective input pixel value ($X_1, X_2, X_3 \ldots X_d$) satisfies the output threshold, which guarantees the prediction accuracy. According to some embodiments, an output can equal:

$$[d_1, d_2, \ldots d_{4096}] = [X_1*W_1, X_2*W_2 \ldots X_{4096}*W_{4096}],$$

where the value 4096 provides an example value of the number of pixels in an image; and $d_1, d_2 \ldots d_{4096}$ are the desired deep descriptor values for the respective pixel input. As discussed below, based on such output descriptor values, the appropriate label can be determined.

FIG. 5B illustrates another non-limiting example similar to FIG. 5A; however, the example in FIG. 5B depicts a multi-layer CNN modeling image X's pixels: ($X_1, X_2, X_3 \ldots X_d$). FIG. 5B depicts input pixels ($X_1, X_2, X_3 \ldots X_d$) being analyzed through a plurality of layers of the CNN to determine weights ($W_1, W_2, W_3 \ldots W_d$). According to some embodiments, the CNN includes five (5) convolutional layers, each including a convolution, a ReLU layer, and a pooling layer. Therefore, in some embodiments, each layer may have a sub-weight applied to enable the optimized output. The principles and application of FIG. 5B are applied to EC database images to determine network weights W that minimize the error (E(w)) between the true training label $y_i$ and estimated labels $f_w(x_i)$:

$$E(w) = \sum_{i=1}^{N} (y_i - f_w(x_i))^2,$$

where N equals the number of layers in the CNN. Here, according to some embodiments as in FIG. 5A, to determine or learn the w value, a perceptron learning algorithm or a back-propagation algorithm, can be utilized to derive the optimized parameters.

Thus, when the appropriate error and/or satisfaction of the threshold is achieved, in connection with FIGS. 5A and 5B, the outputs of each respective flow chart (and equations) produce the deep descriptors of the analyzed image, which are then further analyzed to determine the appropriate label for the analyzed (and input) image. Step 402 results in, using the CNN as the base deep network for training the system, deep descriptors being identified/determined for each product image within an EC dataset.

As discussed above, each image has an associated product label which corresponds to how an image is identified, categorized or classified. The label for each image can be stored as metadata in association with the image in the database. According to some embodiments, EC product images are labeled according to their product category, which, in some embodiments, can then be used to train other images in a dataset and/or other networks (or databases of images).

Step 402 is performed by the deep network module 310 of the DFS engine 308. In some embodiments, the same CNN function algorithm can be used to determine the deep descriptors and the label for an image. Therefore, modeling Step 402 can result in the determination of deep descriptors of all images in an EC database and identification and application of product labels for each image based on image pixels of each image being input into a CNN algorithm.

Step 404 involves the determination of the deep hash code (DHC) for each image (and image category—label). Such DHC determination is performed by the deep feature extraction module 314. In Step 404, a test image is identified. A test image refers to an image within an already trained network or database/dataset—i.e., an image having been analyzed by Step 402. The identification of the test image is performed at a predefined size, for example: 227×227×3 pixels. The deep descriptor values (from Step 402) are then translated into an image feature vector having a dimensional value proportional to the pixel value of the image. According to embodiments of the present disclosure, the feature vector is a result of forward propagation of the descriptor values through the layers of the CNN. For example, using a 4096 pixel product image as the test image, such propagation results in a 4096 dimensional feature vector.

Step 404 then involves transforming the feature vector into an m-bit DHC by applying any known or to be known Eigen-hash algorithm (e.g., spectral hashing) to the feature vector. As understood by those of skill in the art, an Eigen-hash algorithm can produce compact m-bit codes from data-points of a feature vector so that the Hamming distance (or other known or to be known type of distance calculation) between m-bit codes correlates with a semantic similarity. According to some embodiments, for the determined DHC, a hash key h(x) is determined based on rounding the output of the product image (from the Eigen-hash algorithm) with a random hyper-plane:

$$h(x) = \text{sign}(w^T*x - t),$$

where w represents the feature vector as a projection vector in feature space; t is a threshold scalar. The DHCs for each image can be stored as metadata in association with the image in the database. As illustrated in FIG. 5C, which is a non-limiting example of a DHC for a product image, there can be five (5) hyper-planes representing a five-dimensional matrix, where the number of dimensions is indicated by the number of hyper-planes. As illustrated, the hyper-planes are denoted by: $h_1, h_2, h_3, h_4$ and $h_5$, and their associated dotted lines in the dimensional matrix depicted in FIG. 5C.

In some embodiments, the number of hyper-planes corresponds with the number of layers of the CNN. In FIG. 5C, the m-bit codes for an image are depicted as dots on the graph, and each code carries an Eigenvalue. The Eigenvalue of each code is either one (1) or zero (0), where a value of one (1) indicates that the code is above a particular hyper-plane, and a value of zero (0) denotes that that the code is below a particular hyper-plane. For example, the Eigenvalue for a DHC can be [1,1,0,1,0,0,0 . . . ], with the quantity of Eigenvalues equaling the number of data-points on the feature vector. Therefore, using a 4096 pixel image for example, Step 404 results in each 4096-dimension deep descriptor being mapped to 4096-bits by the selected 4096 projected hyper-planes (or directions), where the mapping results are referred to as DHCs.

According to some embodiments, some data-points of a feature vector may be denser in one dimension compared to another. For example, in the case of EC product search, some features may be more sensitive than others in differentiating products. To achieve accurate hashing result (e.g., DHC), the partition dimensions are determined according to the distribution of values in that dimension. Unlike the popular locality-sensitive hash (LSH) that uses random hyper-plane sampled from a zero-mean multivariate Gaussian, the disclosed systems and methods extract directions $w_i$ (i.e., eigenvectors) with the top maximum variances through Principal Component Analysis (PCA) on the data so that the samples will be uniformly grouped (referred to herein as "bucketed") according to a determined (and labeled) DHC.

In Step 406, Process 400 then categorizes each DHC within a "bucket" (representing a product or content category, as discussed above) according to the label applied to the original image. For example, if two images are labeled as "produce" and "cosmetics," respectively, then the DHC for each image will be placed in a corresponding "bucket" associated with each label category. Determination of a "bucket" can be based on a distance between DHC codes, or the relationship between DHC codes within determined hyper-planes. For example, if two DHC codes are associated with the product "purses," such codes may fall within, as illustrated in FIG. 5C, hyper-plane $h_5$ and $h_4$, and above hyper-plane $h_2$.

Turning to FIG. 6, Process 600 details the steps for a user performing the "coarse-to-fine" search utilizing the formulated learning model from Process 400 according to some embodiments of the present disclosure. As discussed above, and in more detail below, both the DHC and deep descriptors have faster retrieval performances than conventional hand-crafted features when performing an EC product image search. As discussed above, a DHC-based search is more computationally efficient, while the deep descriptor-based search is more accurate. As discussed above, the DHC and deep descriptors are complementary, thereby enabling the "coarse-to-fine" search strategy for EC product image search. The basis for such strategy is that a DHC-based search serves as an initial coarse-level search component to quickly filter out unrelated image results, while a deep descriptor-based search acts as a fine-level search component to select a final candidate(s) or candidate set.

By way of non-limiting example of Process 600 (and Process 400), solely in order to provide an illustrative embodiment of the present disclosure, user Bob is at the park playing baseball and takes a picture with his phone of a baseball bat. Bob desires to locate or "shop" for products matching the captured image. Specifically, Bob is looking to buy a bat similar to the one photographed. As discussed below, Bob can upload the image as a search query to an online e-commerce site (e.g., Yahoo! Search® or Yahoo! Shopping®) and the like) and be provided with results comprising products that match his query.

As discussed in more detail below, Bob is uploading his image to a search computer environment that has been trained according to deep network learning (CNN), as in Process 400 discussed above. Therefore, Bob's search query will be processed according to the disclosed "coarse-to-fine" search, which is executed by the DFS engine 308. That is, Bob's captured image will be processed to determine a DHC for the photographed bat. As discussed below, the DHC can be generated or determined locally on Bob's device (via a mobile DFS application which can be a stand-alone application or an application configured with such capabilities) or at a server or other remote device to Bob that houses the DFS technology for producing the DHC of the uploaded image. The DHC of the captured image will form the basis of Bob's search query which will be processed according to the coarse deep feature search and fine deep feature search. Such searches are performed in accordance with the learned DHCs produced from the learned CNN feature modeling of the e-commerce site or other site with such functionality, as discussed above in relation to FIGS. 4-5C. As a result, Bob is provided with a result set that accurately and efficiently provides Bob with a refined listing of similar bats to the one Bob photographed.

Therefore, according to some embodiments Process 600 depicts a coarse-to-fine search approach. A DHC-based application is initially performed on a captured image ("coarse level"), and then a deep descriptor-based application is applied to captured image ("fine level"). As seen from the below discussion, only products having a similar DHC (in the same hash bucket) with the captured (or query) image will be passed to the fine level search, where the distance between deep descriptors of the captured image and database images are calculated (e.g., Euclidean distance) as the final search ranking.

Process 600 begins with Step 602 where a user captures an image. Step 602 is performed by the capture module 312. In some embodiments, the image capture occurring in Step 602 can involve a user taking a picture using a digital device (e.g., mobile phone, wearable device or digital camera or the like). In some embodiments, the image capture of Step 602 can involve a user taking a screenshot, copying or otherwise downloading an image on his/her device. In some alternative embodiments, the image capture can include a user capturing a URL for an image, for example, from a web-site.

In Step 604, a DHC for the captured image is determined. Step 604 is performed by the deep feature extraction module 314. The determination of the DHC can be performed in accordance with the steps outlined in Process 400: Steps 402-406. That is, as discussed above, the captured image is analyzed in order to extract/determine deep descriptors of the captured image. These deep descriptors are formulated into a feature vector whereby the hash function discussed above is applied so as to determine the DHC for the image. According to some embodiments, the determination of the captured image's DHC can be performed on the capturing device or on a server or other device. That is, in some embodiments, the image can be processed through a locally or remotely stored DFS (or DHC) application that produces the DHC result. As such, in some embodiments, the DFS engine 308 can be embodied as a mobile or desktop application or "app", downloadable from a mobile or remote online store. In some embodiments, the DFS engine 308 can be a web-based application requiring no download of data, in that a user simply must access the site at which the application is located.

In Step 606, a search query is formulated based on the DHC and deep descriptors associated with the captured image—image query 302 from FIG. 3. In some embodiments, as soon as the DHC is computed for a captured image, a search query is generated which comprises the DHC and deep descriptors of that image. In embodiments where the DHC is computed by a server (or at a remote location on a network), Step 604 involves the captured image (or captured image data and metadata) being communicated to the server/location, and after the DHC is computed, the DHC can be communicated back to the capturing device or immediately to the search server. Step 606 therefore involves submitting the search query to the search server. Steps 606-610 are performed by the coarse-to-fine search module 316.

In response to receiving the search query, the search server in Step 608 compares the DHC of the captured image to the DHCs of the images in the image database 306. The comparison involves analyzing each DHCs position within the hyper-plane matrix (as illustrated in FIG. 5C) to identify which bucket the captured image's DHC falls within. Step 610 involves identifying such bucket, which represents an image category (from the product image label discussion above).

In Step 612, for each product image having a DHC within the identified bucket (from Step 610), a similarity analysis is performed between the deep descriptors of such images and the deep descriptors of the captured image. Step 612 is performed by the similarity module 318. Such similarity or distance (or calculation) can be computed according to any known or to be known distance calculation algorithm, including, but not limited to, Euclidean distance algorithm, Chebyshev distance algorithm, Hamming distance algorithm, Mahalanobis distance algorithm, and the like.

According to some embodiments, Step 612's similarity (D) between images determination includes performing the following computation:

$$D(x,y) = \sqrt{(x-y)^2}$$

Where X denotes a deep descriptor value of the captured image, and Y denotes a deep descriptor value of an image identified as being associated with a DHC in the bucket from Step 610. In some embodiments, a similarity threshold value can be applied, which can be set by the system, administrator, user, search server, DFS engine 308, or some combination thereof. That is, performing the similarity determination can eliminate certain results that do not satisfy (at least equal to) a similarity threshold. For example, if the comparison between a captured image's deep descriptors and a database image's descriptors falls below the threshold, then such image would be removed from the search results.

For example, if deep descriptors for the captured image indicate that the product being sought is a "black, leather purse" and the bucket being analyzed (in Step 612) is for "purses"—then some purses may be eliminated or removed from the results should they not satisfy all three criteria. For example, if a product image is for a "black, velvet, purse", this image may be eliminated from contention for display when providing the results because it is not "leather" as requested by the user via his/her search query.

In some embodiments, the database images associated with the identified bucket can be ranked, so that the image results are provided to the user in a decreasingly similar order. Step 614. Step 614 is performed by the similarity module 318. Such ranking is based on the above similarity determination (D), whereby the results with the higher similarity value (D) will be ranked higher than those with a lower value. Indeed, some images having a similarity value (D) below a threshold may be removed from the search results or provided on a subsequent page.

In Step 616, the ranked product images in the database are compiled and provided to the user as a search result. Step 616 is performed by the results module 320. That is, the compiled and ranked results, which comprise the product information (images and product information such as, URLs and the like as with most search results) most closely associated with the captured image, are communicated from the searching server to the user for display on the user's device. As discussed above, the time from the image query submission to the results being returned to the user can be performed in less than 5 milliseconds.

FIG. 7 is a work flow 700 of serving relevant advertisements based on the content of a search, as in FIG. 6. Specifically, FIG. 7 illustrates how advertisements are served to a user performing a product search based on at least one of: the category (or label) or content of the captured image, category or content of the searched product images, and/or the category of content of the search results. Indeed, according to some embodiments, the content that forms the basis of the advertisement(s) can be based on a label of an image, a DHC bucket, the DHC of the captured image or a deep descriptor associated with a stored product image or captured image, or other contextual data surrounding the image or its capture (e.g. the location where the picture of the bat was taken in the example described above).

In Step 702, a context is determined based on at least one of the above factors. That is, a context is determined based on either the content of an image captured (and searched), content of an image provided in a search result, and/or deep descriptors, DHC or labels of the images or other metadata in the database and/or captured image are analyzed to identify a context. This context forms a basis for serving advertisements having a similar context (i.e., relating to the type of content).

In some embodiments, the identification of the context from Step 702 may occur during the image capture, during the transformation of the captured image into DHCs, during searching and/or during or after providing the search results, or some combination thereof. In Step 704, the context (e.g., content/context data) is communicated (or shared) from the user's device or search platform to an advertisement platform comprising an advertisement server 130 and ad database. Upon receipt of the context, the advertisement server 130 performs a search for a relevant advertisement within the associated ad database. The search for an advertisement is based at least on the identified context.

In Step 704, the advertisement server 130 searches the ad database for advertisements that match the identified (and extracted) context. In Step 706, an advertisement is selected (or retrieved) based on the results of Step 704. In some embodiments, the advertisement can be selected based upon the result of Step 704, and modified to conform to attributes of the page or method upon which the advertisement will be displayed, and/or to the device for which it will be displayed. In some embodiments, as in Step 708, the selected advertisement is shared or communicated via the search platform. In some embodiments, as in Step 708, the selected advertisement is shared or communicated via the application the user used to capture the image and/or perform the DFS search. In some alternative embodiments, the selected advertisement is sent directly to each user's computing device. The advertisement is displayed in conjunction with the search results being displayed to the user.

Figure 8:
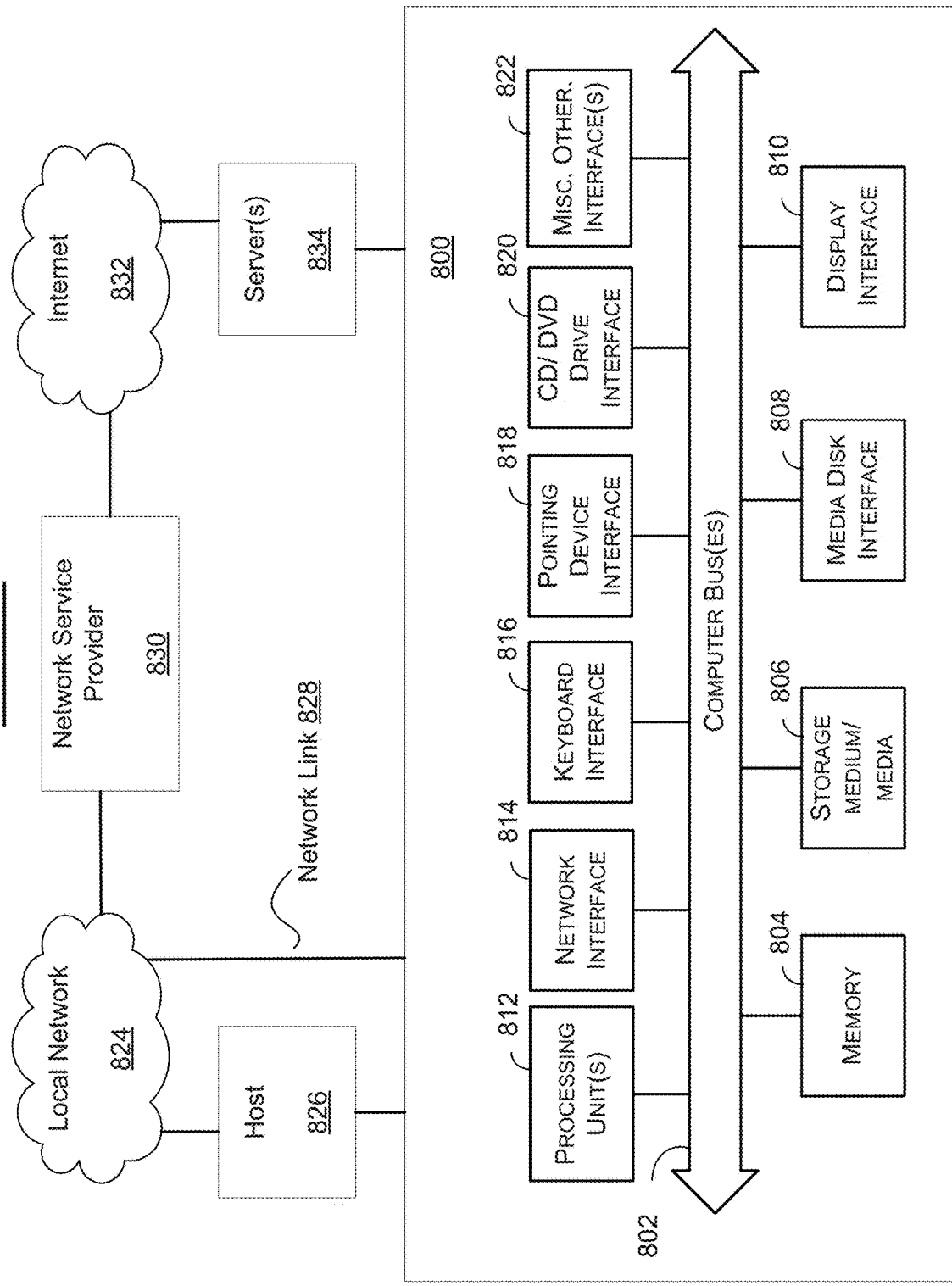
FIG. 8 is a block diagram illustrating architecture of a hardware device in accordance with one or more embodiments of the present disclosure.

As shown in FIG. 8, internal architecture 800 of a computing device(s), computing system, computing platform and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device over a network from a user, a search query comprising image data associated with a captured image;
   identifying, via the computing device, features of the captured image from the image data, said features comprising information associated with a content category of the captured image, said features further indicating a pixel value of the captured image;

propagating, via the computing device by executing a forward-propagation algorithm, the features through a convolutional neural network (CNN), and using a hidden layer of the CNN to determine deep descriptor values of the features;

translating, via the computing device, based on said propagation, the deep descriptor values into a feature vector, the feature vector comprising a dimensional value proportional to the pixel value of the captured image;

transforming, via the computing device, the feature vector into a deep hash code (DHC) based on an applied Eigen-hash algorithm and based on hyper-plane values that indicate the content category and correspond to a number of layers in the CNN;

determining, via the computing device, based on the transformation of the feature vector, a DHC for the captured image;

generating, via the computing device, a search query comprising information related to the DHC of the captured image;

searching, via the computing device, an e-commerce (EC) database based on the generated search query, the EC database comprising DHCs of images, said search comprising analyzing positions of the captured image's DHC and the EC database's DHCs within a matrix defined by said hyperplane values, and based on said analysis, identifying a content category of the captured image; and communicating, via the computing device over the network, a search result to said user comprising a set of EC images within said identified content category.

2. The method of claim 1, further comprising:
determining a label for each EC image based on the extracted deep descriptors from the EC images, wherein each label comprises information indicating a particular content category.

3. The method of claim 2, wherein each determined label for each EC image is stored in the EC database in association with a corresponding EC image.

4. The method of claim 1, further comprising:
receiving, over the network from a device of the user, said DHC for the captured image, wherein said DHC for the captured image is determined by the user device and communicated to the computing device as at least part of the search query.

5. The method of claim 1, further comprising:
determining a context of the captured image based on the extracted features;
communicating said context to an ad platform, over the network, to obtain an advertisement associated with said context; and
causing communication, over the network, of said identified advertisement to said user for display in association with the search result.

6. A non-transitory computer-readable storage medium tangibly encoded with computer-executable instructions, that when executed by a processor associated with a computing device, performs a method, comprising:
receiving, over a network from a user, a search query comprising image data associated with a captured image;
identifying features of the captured image from the image data, said features comprising information associated with a content category of the captured image, said features further indicating a pixel value of the captured image;

propagating, by executing a forward-propagation algorithm, the features through a convolutional neural network (CNN), and using a hidden layer of the CNN to determine deep descriptor values of the features;

translating, based on said propagation, the deep descriptor values into a feature vector, the feature vector comprising a dimensional value proportional to the pixel value of the captured image;

transforming the feature vector into a deep hash code (DHC) based on an applied Eigen-hash algorithm and based on hyper-plane values that indicate the content category and correspond to a number of layers in the CNN;

determining, based on the transformation of the feature vector, a DHC for the captured image;

generating a search query comprising information related to the DHC of the captured image;

searching an e-commerce (EC) database based on the generated search query, the EC database comprising DHCs of images, said search comprising analyzing positions of the captured image's DHC and the EC database's DHCs within a matrix defined by said hyperplane values, and based on said analysis, identifying a content category of the captured image; and communicating, over the network, a search result to said user comprising a set of EC images within said identified content category.

7. The non-transitory computer-readable storage medium of claim 6, further comprising:
determining a label for each EC image based on the extracted deep descriptors from the EC images, wherein each label comprises information indicating a particular content category, wherein each determined label for each EC image is stored in the EC database in association with a corresponding EC image.

8. The non-transitory computer-readable storage medium of claim 6, further comprising:
receiving, over the network from a device of the user, said DHC for the captured image, wherein said DHC for the captured image is determined by the user device and communicated to the computing device as at least part of the search query.

9. A system, comprising:
a processor; and
a non-transitory computer-readable storage medium for tangibly storing thereon program logic for execution by the processor, the program logic comprising:
logic executed by the processor for receiving, over a network from a user, a search query comprising image data associated with a captured image;
logic executed by the processor for identifying features of the captured image from the image data, said features comprising information associated with a content category of the captured image, said features further indicating a pixel value of the captured image;
logic executed by the processor for propagating, by executing a forward-propagation algorithm, the features through a convolutional neural network (CNN), and using a hidden layer of the CNN to determine deep descriptor values of the features;
logic executed by the processor for translating based on said propagation, the deep descriptor values into a feature vector, the feature vector comprising a dimensional value proportional to the pixel value of the captured image;

logic executed by the processor for transforming the feature vector into a deep hash code (DHC) based on an applied Eigen-hash algorithm and based on hyperplane values that indicate the content category and correspond to a number of layers in the CNN;

logic executed by the processor for determining, based on the transformation of the feature vector, a DHC for the captured image;

logic executed by the processor for generating a search query comprising information related to the DHC of the captured image;

logic executed by the processor for searching an e-commerce (EC) database based on the generated search query, the EC database comprising DHCs of images, said search comprising analyzing positions of the captured image's DHC and the EC database's DHCs within a matrix defined by said hyperplane values, and based on said analysis, identifying a content category of the captured image; and logic executed by the processor for communicating, over the network, a search result to said user comprising a set of EC images within said identified content category.

10. The system of claim 9, further comprising:

logic executed by the processor for determining a label for each EC image based on the extracted deep descriptors from the EC images, wherein each label comprises information indicating a particular content category, wherein each determined label for each EC image is stored in the EC database in association with a corresponding EC image.

* * * * *